Feb. 20, 1923.
V. FLINN.
HACK SAW.
FILED MAR. 5, 1921.
1,446,007.
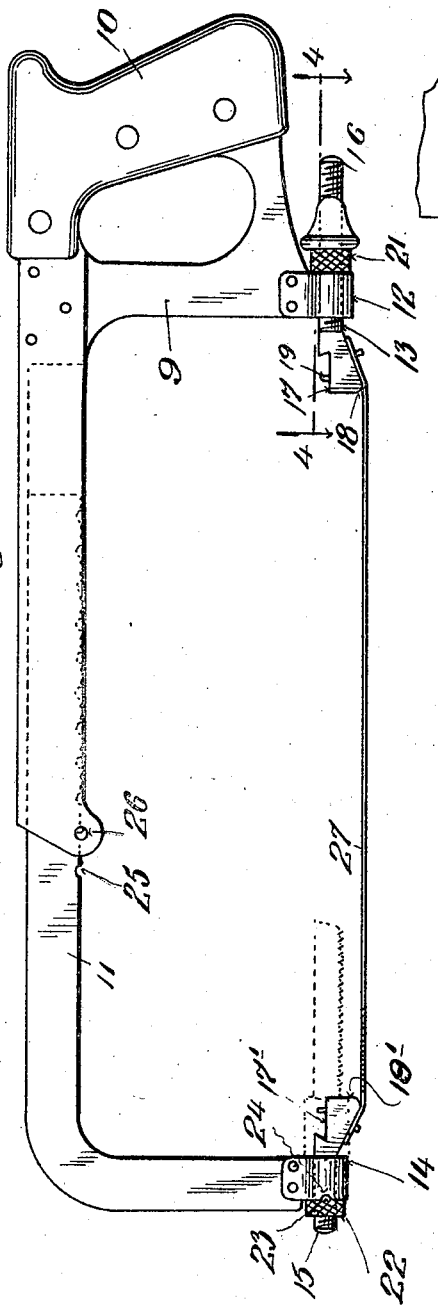
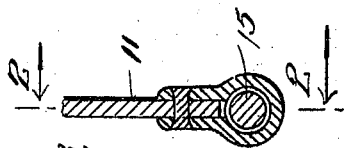
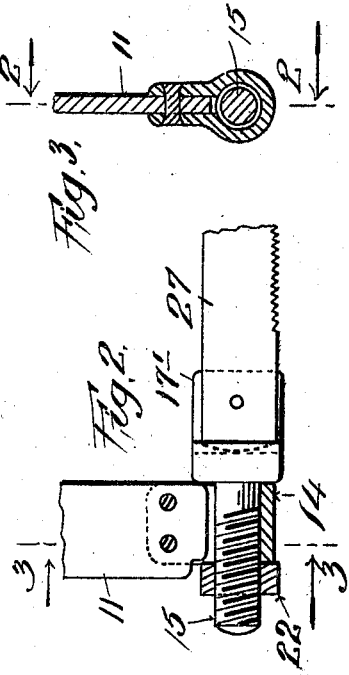
INVENTOR
Vincent Flinn
BY his ATTORNEYS
Darby & Darby Patented Feb. 20, 1923.

1,446,007

UNITED STATES PATENT OFFICE.

VINCENT FLINN, OF NEW YORK, N. Y.

HACK SAW.

Application filed March 5, 1921. Serial No. 449,632.

*To all whom it may concern:*

Be it known that I, VINCENT FLINN, a citizen of the United States, residing at New York, county and State of New York, have made a certain new and useful Invention in Hack Saws, of which the following is a specification.

This invention relates to hack saws wherein the saw blade is adjustable to different positions, and has for its object the production of a cutting device whereby it is possible to so position the cutting blade that the saw may be used in different positions and as a close cut saw.

A further object of my invention includes the provision of an inexpensive, efficient, but rugged and readily adjustable saw or cutter blade holder and fastener for holding and for accommodating blades of different lengths and of different cutting qualities and capacities.

Other objects will appear hereinafter.

I attain the objects of my invention by a mechanism illustrated in the accompanying drawing, in which—

Figure 1 is a side elevation of my device;

Figure 2 is a detail view of the outer blade holder and adjacent means viewed in the direction of the arrows on line 2—2 of Fig. 3;

Fig. 3 is a section on the line 3—3 of Fig. 2;

Fig. 4 is a section on the line 4—4 of Fig. 1, showing details of the inner blade holder and adjuster, and Fig. 5 is an enlarged view partially in section of said inner blade holder and adjuster.

Referring now to the drawing, in which similar numerals refer to similar parts, 9 represents a main saw frame provided with a co-extensive handle 10, and having an extension 11. The main saw frame is provided with an inner swivel bearing 12, in which is positioned the inner blade holder and adjuster 13. On the extension of the saw frame 11 there is provided a similar outer swivel bearing 14, having an outer adjustable blade holder 15. The blade holder 13 has a screw extension 16 at one end, and one or more seating and holding positions 17 and 18, provided with holding pins 19 and 20. This holder blade is loosely fitted in the swivel bearing 12, and is adjustably held in position by an adjusting and locking nut 21. The outer blade holder and adjuster is also provided with saw seats 17' and 18' similar to those of the inner holder. On the screw extension of the outer holder there is an adjusting and locking nut 22. This locking nut is provided with one or more extensions 23, which fit into seats 24 for the purpose of definitely positioning the saw blade holder and giving the desired position to the saw blade. It is apparent that the bevel seats 18 and 18' position and hold the saw-blade outside of the extreme points of the blade holders, and thereby permit close cutting, not only as shown in Fig. 1, but in varying positions about the pivotal axis of said blade holders.

For the purpose of accommodating saws of different lengths, there is provided an extension ratchet on an extension frame 11, which comprises notches 25 adapted to fit into seats 26.

In practice I find it convenient to place a saw or cutter blade 27 on the respective seats, as shown in Fig. 1, for example, thereafter adjusting and locking the saw blade in position. When the blade is positioned at right angles to the plane of the frame, I am enabled to use my saw as a close cut saw, whereby I am enabled to operate in positions which it has heretofore been impossible to operate because the cutting blade, by reason of my holder construction, lies and operates outside of the projections of any parts of the saw frame and handle. If it is desired to use the cutter blade in other positions, it is only necessary to unlock the nut 21, adjust the blade in the desired position and again lock. For certain purposes it may be desirable to position the saw on seats 17 and 17'.

Having now set forth the objects and nature of my invention, and a construction embodying the same, what I claim as new and useful and of my own invention, and desire to secure by Letters Patent, is:

1. In a close cut saw, an adjustable frame, saw blade holders on said frame, said holders having lateral projections whereby the plane of the saw blade is positioned beyond the utmost projection in the same direction of any part of said frame.

2. In a close cut saw, a frame, swivel joints on said frame, and means in said joints for holding the cutting portion of a saw blade in a position beyond the utmost projection in the same direction of any part of said frame.

3. In a close cut saw, a frame, swivel joints on said frame, and a double seated rotatable blade holder for each of said joints whereby a saw blade may be positioned and fastened in the axial alignment beyond the utmost projection in the same direction of any part of the saw frame.

In testimony whereof I have hereunto set my hand on this 28 day of February, A. D., 1921

VINCENT FLINN.